United States Patent
Lohneis

(10) Patent No.: US 11,613,285 B2
(45) Date of Patent: Mar. 28, 2023

(54) METHOD FOR OPERATING A RAIL VEHICLE

(71) Applicant: SIEMENS MOBILITY GMBH, Munich (DE)

(72) Inventor: Georg Lohneis, Ebensfeld (DE)

(73) Assignee: Siemens Mobility GmbH, Munich (DE)

( * ) Notice: Subject to any disclaimer, the term of this patent is extended or adjusted under 35 U.S.C. 154(b) by 564 days.

(21) Appl. No.: 16/630,930

(22) PCT Filed: Jul. 13, 2018

(86) PCT No.: PCT/EP2018/069163
§ 371 (c)(1),
(2) Date: Jan. 14, 2020

(87) PCT Pub. No.: WO2019/012144
PCT Pub. Date: Jan. 17, 2019

(65) Prior Publication Data
US 2020/0231195 A1    Jul. 23, 2020

(30) Foreign Application Priority Data

Jul. 14, 2017  (DE) .................. 10 2017 212 109

(51) Int. Cl.
| | |
|---|---|
| *B61L 27/70* | (2022.01) |
| *B61L 15/00* | (2006.01) |
| *B61L 27/40* | (2022.01) |
| *B61L 27/50* | (2022.01) |

(52) U.S. Cl.
CPC ............ *B61L 27/70* (2022.01); *B61L 15/009* (2013.01); *B61L 27/40* (2022.01); *B61L 27/50* (2022.01)

(58) Field of Classification Search
CPC .......... B61L 27/70; B61L 27/40; B61L 27/50; B61L 27/20; B61L 15/009; B61L 15/0036; B61L 15/0072; B61L 15/0027; B61L 15/00; G06F 8/61
See application file for complete search history.

(56) References Cited

U.S. PATENT DOCUMENTS

| | | |
|---|---|---|
| 7,142,962 B1 | 11/2006 | Pflieger et al. |
| 7,209,817 B2 | 4/2007 | Abdel-Malek et al. |
| 9,694,834 B2 | 7/2017 | Shubs, Jr. et al. |
| 10,435,050 B2 | 10/2019 | Nock et al. |
| 2013/0217332 A1* | 8/2013 | Altman ............... G01S 1/02 455/3.01 |
| 2014/0006454 A1* | 1/2014 | Danado ............ H04M 1/72457 707/796 |

(Continued)

FOREIGN PATENT DOCUMENTS

| | | |
|---|---|---|
| CN | 101385048 A | 3/2009 |
| CN | 103136001 A | 6/2013 |

(Continued)

*Primary Examiner* — Russell Frejd
(74) *Attorney, Agent, or Firm* — Laurence A. Greenberg; Werner H. Stemer; Ralph E. Locher

(57) ABSTRACT

A method for operating a rail vehicle includes transmitting an identifier for a software component and/or an identifier for a hardware component of a control system of a rail vehicle. The identifier is transmitted from a computation unit of the rail vehicle to a stationary central computation unit, at least at one predetermined point in time.

4 Claims, 1 Drawing Sheet

(56) References Cited

U.S. PATENT DOCUMENTS

| | | |
|---|---|---|
| 2014/0068561 A1 | 3/2014 | Halder |
| 2014/0336851 A1 | 11/2014 | Kadono et al. |
| 2015/0210303 A1 | 7/2015 | Seidler et al. |
| 2015/0328986 A1* | 11/2015 | Nordbruch ....... G08G 1/096775 701/537 |
| 2017/0106883 A1* | 4/2017 | Shubs, Jr. ............ B61L 15/009 |

FOREIGN PATENT DOCUMENTS

| | | |
|---|---|---|
| CN | 103227828 A | 7/2013 |
| CN | 103847764 A | 6/2014 |
| CN | 104081726 A | 10/2014 |
| CN | 104583049 A | 4/2015 |
| CN | 104603751 A | 5/2015 |
| CN | 105059328 A | 11/2015 |
| CN | 106528207 A | 3/2017 |
| CN | 106897087 A | 6/2017 |
| DE | 102011082123 A1 | 3/2013 |
| DE | 102012215260 A1 | 3/2014 |
| DE | 102014203666 A1 | 9/2015 |
| DE | 102014113371 A1 | 3/2016 |
| WO | WO8501258 * | 3/1985 |

* cited by examiner

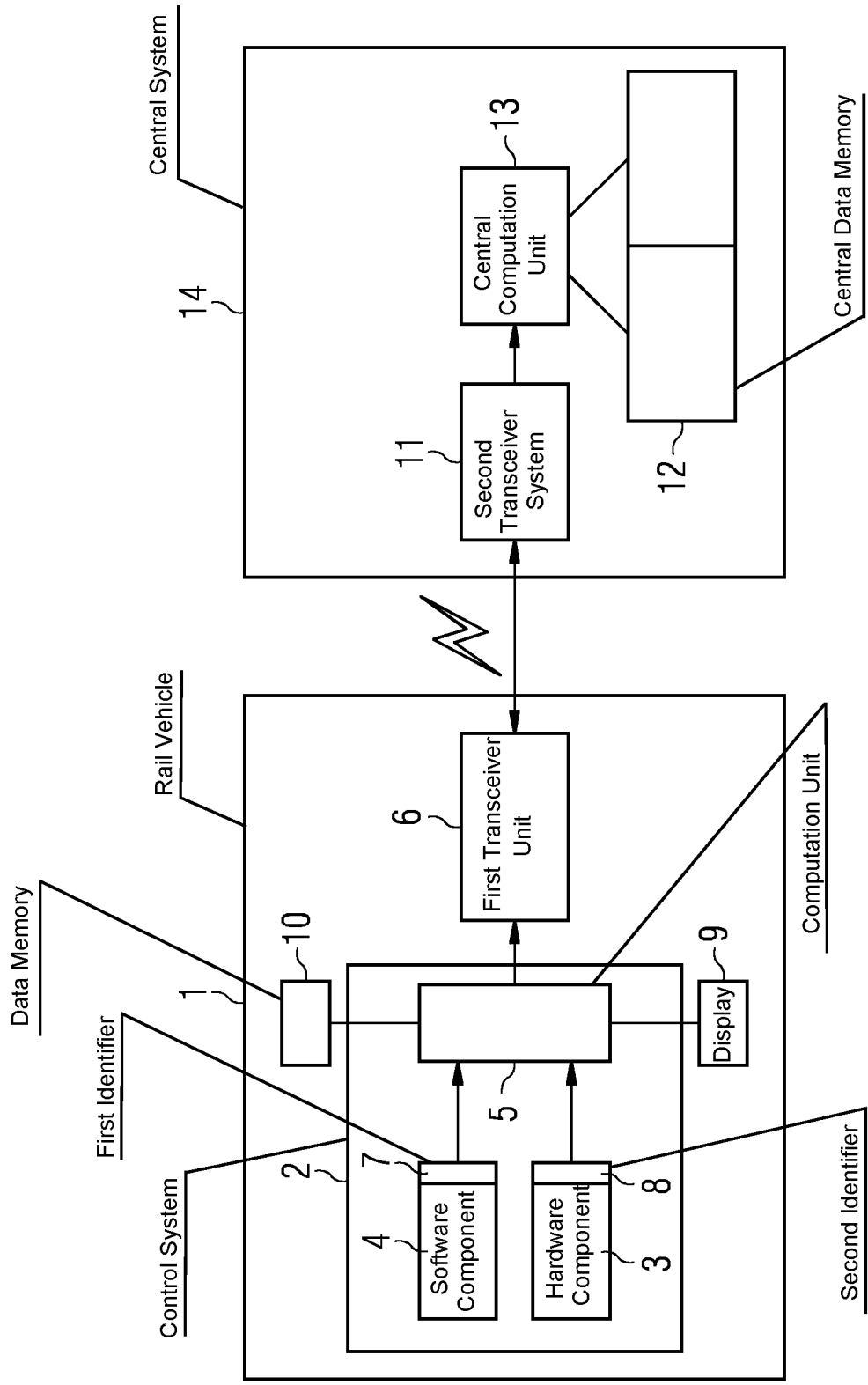

METHOD FOR OPERATING A RAIL VEHICLE

BACKGROUND OF THE INVENTION

FIELD OF THE INVENTION

The invention relates to methods for operating a rail vehicle.

The prior art discloses rail vehicles that have a control system for at least one function of the rail vehicle. The control system has a computation unit and uses a hardware component and/or a software component to carry out control tasks.

SUMMARY OF THE INVENTION

The object of the invention consists in providing an improved method for operating a rail vehicle.

The objects of the invention are achieved by way of the independent patent claims.

An advantage of the proposed method consists in that precise information about software components and/or hardware components that are used by a control system of a rail vehicle are present in a stationary central computation unit. The currently present equipment features of the rail vehicles are therefore known to the central computation unit. The operation of the rail vehicle can be improved in this way. In particular, faults during operation of the rail vehicle can be reduced. Furthermore, outlay for troubleshooting can be reduced since the hardware component and/or software component actually installed in the rail vehicle and in operation is known to the central computation unit.

These advantages are achieved by virtue of an identifier for a software component and/or an identifier for a hardware component of a control system of a rail vehicle being transmitted, at least at a predetermined time, from a computation unit of the rail vehicle to a stationary central computation unit.

In one embodiment, the identifier of the software component and/or the identifier of the hardware component are identified by the computation unit and/or input into a data memory of the rail vehicle by an operator control person. As a result thereof, the identifiers of the software component and/or the hardware component can be identified in a simple and reliable manner.

In one embodiment, the time of the transmission of the identifier to the central computation unit is determined temporally or by a determined process, in particular by a switch-on of the control system. This ensures that the information about the identifier of the hardware component and/or the software component is transmitted to the central computation unit in a manner as up-to-date and reliable as possible.

In a further embodiment, an identifier for the rail vehicle in which the hardware component and/or the software component is installed and/or in operation is transmitted together with the identifier of the software component and/or together with the identifier of the hardware component from the computation unit of the rail vehicle. Depending on the selected embodiment, an identifier for the control system of the rail vehicle that accesses the software component and/or the hardware component can be transmitted to the central computation unit. More precise information about the use of the software component and/or the hardware component can be effected by the identifier of the control system and/or the identifier of the rail vehicle.

In a further embodiment, in the case of installation or implementation of a new software component and/or in the case of installation or implementation of a new hardware component, the computation unit of the rail vehicle transmits the identifier for the new software component and/or the identifier for the new hardware component to the central computation unit. This achieves a situation in which the central computation unit has precise information about the software component and/or hardware component currently installed in the rail vehicle or in operation.

In a further embodiment, after installation or after implementation of a new hardware component by way of the control system, a new software component for the new hardware component is received by the computation unit from the central computation unit. The new hardware component is operated by the control system with the transmitted new software component. This makes it possible to automatically match the software component to the used hardware component in optimum fashion. For example, it is therefore possible to prevent new hardware components being operated with old software components even though even newer and better matching software components for the hardware components are present.

In a further embodiment, the computation unit requests from the central computation unit information and/or documentation about the software component and/or information and/or documentation about the hardware component with naming of the identifier of the software component and/or with naming of the identifier of the hardware component. After receiving the information and/or the documentation from the central computation unit, the information and/or the documentation can be output by the computation unit to an operator control person. For example, the operator control person can use the information and/or the documentation for maintenance. In particular, the information and/or the documentation can be presented on a screen of the rail vehicle or transmitted and presented on a mobile device, in particular a tablet PC or a cell phone.

The proposed method for operating the rail vehicle is also improved by virtue of an identifier for a software component and/or hardware component installed in the rail vehicle being stored in a data memory of the central computation unit. The identifier can be received by the stationary central computation unit. For example, the identifier can be transmitted from the rail vehicle to the stationary central computation unit. In another embodiment, the identifier can also be provided to the central computation unit in another way. For example, the identifier can be stored in a data memory of the stationary central computation unit. The identifier can, for example, be read in from a database. As a result thereof, the central computation unit has the identifiers of the software component and/or the hardware component of the rail vehicle available.

In one embodiment, the identifier of the software component and/or the identifier of the hardware component are assigned to a determined rail vehicle in the data memory of the central computation unit. As a result thereof, improved information about the technical equipment of the rail vehicle and the technical boundary conditions for the software component and/or the hardware component are provided. On account of the identifier of the rail vehicle, prescribed boundary conditions of the rail vehicle that are important for the operation of the software component and/or the hardware component can be identified more precisely and more quickly.

In a further embodiment, an identifier for the rail vehicle is received together with the identifier of the software component and/or the identifier of the hardware component. As a result thereof, the technical environment in which the software component and/or the hardware component are used can be identified more precisely. For this purpose, a database can be provided, which contains further technical boundary conditions of the rail vehicle for each rail vehicle, that is to say for each identifier of a rail vehicle. Said boundary conditions can be taken into account accordingly both during operation and in the case of maintenance or troubleshooting.

In one embodiment, the central computation unit compares whether the software component and/or the hardware component satisfies at least one boundary condition prescribed for the rail vehicle based on the identifier of the software component and/or based on the identifier of the hardware component. If the software component and/or the hardware component of the rail vehicle do not satisfy the prescribed boundary condition, the central computation unit outputs a notification in particular to the computation unit of the rail vehicle. The notification may be in the form of a warning notification, for example. The warning notification can contain the information that the software component and/or the hardware component does not satisfy the prescribed boundary condition. The boundary conditions can be stored, for example, in a data memory of the central computation unit for a prescribed rail vehicle, in particular for identifiers of rail vehicles. The boundary conditions can be stored, for example, in a data memory of the central computation unit for a prescribed control system, in particular for identifiers of control systems.

In a further embodiment, the central computation unit checks based on the identifier of the software component whether a newer version of the software component is present. If a newer version of the software component is present, the central computation unit transmits corresponding information to the computation unit of the rail vehicle. Depending on the selected embodiment, in addition to or instead of the transmitted information, the central computation unit can transmit the newer version of the software component to the computation unit of the rail vehicle. In this way, it is possible to update the software components using simple means.

The above-described properties, features and advantages of this invention and the way in which they are achieved will become clearer and more clearly understood in association with the following description of the exemplary embodiments that are explained in greater detail in association with the drawings.

BRIEF DESCRIPTION OF THE SEVERAL VIEWS OF THE DRAWING

The sole figure illustrates a schematic illustration of a rail vehicle and of a central computation unit.

DESCRIPTION OF THE INVENTION

The figure shows in a schematic illustration a rail vehicle 1, which has a control system 2. The control system 2 has at least one computation unit 5. The computation unit 5 is also connected to a data memory 10. Depending on the selected embodiment, the computation unit 5 can also be connected to a display 9, for example in the form of a display screen. The computation unit 5 is connected to a software component 4 and to a hardware component 3. Depending on the selected embodiment, the computation unit 5 can also be connected only to a software component or only to a hardware component. In addition, the computation unit 5 can also be connected to a plurality of hardware components 3 and to a plurality of software components 4. The hardware component can have electric and/or electronic circuits. In addition, the hardware component 3 can have a data memory and/or a further computation unit. In addition, the hardware component can have a sensor. The hardware component is connected to the computation unit 5 via an interface. The computation unit 5 accesses the software component 4 and/or the hardware component 3 when a control function for the rail vehicle 1 is processed. In this case, at least sub-functions of the control function can be processed by the hardware component and/or by the software component. The software component 4 can constitute a self-contained program or a subprogram, which is embedded in a larger program. The software component 4 is stored in a data memory, for example the data memory 10, which is connected to the computation unit 5.

Furthermore, the software component 4 has a first identifier 7. The first identifier 7 precisely identifies the software component. For example, the identifier may consist of a serial number and/or a version number. The hardware component 3 likewise has a second identifier 8. The second identifier 8 may consist of a serial number and/or a version number. With the aid of the identifier, in particular with the aid of the serial number and/or the version number, unambiguous assignment to the software component and/or to the hardware component can be effected. The structure and the mode of operation of the software component and/or the hardware component are therefore determined precisely. The first and/or second identifier can also consist, for example, of numbers, letters and/or other signs.

Depending on the selected embodiment, the control system 2 can also have a plurality of computation units 5. In addition, the rail vehicle 1 can also have computation units 5 outside of the control system 2. The computation unit 5 is connected to a first transceiver unit 6. The first transceiver unit 6 is designed to exchange information, in particular identifiers and/or software components, with an external, in particular with a stationary, external central system 14 in a wired or wireless manner.

The central system 14 has a second transceiver unit 11. The second transceiver unit 11 is designed, for example, to exchange identifiers 7, 8 of software components 4 and/or hardware components 3 with the first transceiver unit 6. The second transceiver unit 11 is connected to a central computation unit 13. The central computation unit 13 is connected to a central data memory 12.

The computation unit 5 is designed to identify the first identifier 7 of the software component 4 from the software component 4 and to store it in the data memory 10. The computation unit 5 is designed to identify the second identifier 8 of the hardware component 3 from the hardware component 3 and to store it in the data memory 10. In addition, the identifiers 7, 8 of the software component 4 and/or the hardware component 3 can also already be stored in the data memory 10. For example, an operator control person can input the corresponding identifier of the software component and/or the hardware component in the data memory 10 upon installation or implementation of a software component and/or a hardware component. To this end, the computation unit 5 has input means, in particular a keyboard. Lists of identifiers for software components and hardware components that are installed and/or in operation can therefore be stored in the data memory 10.

The computation unit 5 is designed to transmit an identifier for the software component and an identifier for the hardware component of the control system of the rail vehicle at a prescribed time to the central computation unit 13 with the aid of the first transceiver unit 6. The prescribed time can be effected, for example, at determined times, that is to say for example at 1 o'clock of each first day of a month or at prescribed processes. For example, a determined process can constitute a switch-on of the control system, in particular a start-up of the control system. However, other regularly occurring processes during operation of the rail vehicle can also be used as triggers for transmitting the identifier for the software component and/or the identifier for the hardware component of the control system of the rail vehicle to the central computation unit 13.

In this way, the identifiers of the software components and/or the hardware components transmitted to the central computation unit 13 are highly up-to-date. The identifier can even be transmitted for a software component and/or a hardware component to the central computation unit 13 when the software component and/or the hardware component are installed but not yet used by the control system. In addition, the identifier can also be transmitted by the computation unit 5 to the central computation unit 13 when the control system accesses the software component and/or the hardware component and sets it in operation. In particular, the transmission is expedient when the control system accesses a new software component and/or a new hardware component for the first time.

In addition, depending on the selected embodiment, the computation unit 5 can be designed to transmit an identifier for the rail vehicle 1 to the central computation unit 13 with the aid of the first transceiver unit 6 at the same time together with an identifier of a hardware component and/or with an identifier of a software component. The central computation unit 13 can therefore assign the identifiers of the software components and the hardware components to an identifier of a rail vehicle and therefore to an individual rail vehicle.

The computation unit 5 is also designed to receive a new software component for the new hardware component from the central computation unit 13 with the aid of the first transceiver unit 6 after installation or after implementation of a new hardware component by the control system. In addition, the computation unit 5 is designed to operate the new hardware component with the new software component.

Furthermore, the computation unit 5 is designed to request from the central computation unit information and/or documentation of the software component and/or information and/or documentation of the hardware component with naming of the identifier of the software component and/or the identifier of the hardware component. To this end, the corresponding identifiers are transmitted with the corresponding request via the first transceiver unit 6 and the second transceiver unit 11 to the central computation unit 13.

Furthermore, the computation unit 5 is designed, after receiving the documentation from the central computation unit, to output the information and/or the documentation to an operator control person, for example in order to carry out maintenance or installation of a software component and/or a hardware component. For example, the information and/or the documentation can be displayed to the operator control person with the aid of the display 9. In addition, the information and/or the documentation can be transmitted from the computation unit 5 with the aid of the first transceiver unit 6 on a mobile device, for example a tablet PC of the operator control person.

The central computation unit 13 is designed to receive identifiers of hardware components and/or software components of the rail vehicle via the second transceiver unit 11 and in particular to store them in the data memory 12. In addition, identifiers for the rail vehicles in which the software components and/or the hardware components are installed or in operation can also be received via the second transceiver unit 11 and the central computation unit 13 and can be stored in the central data memory 12. In this case, the identifiers of the hardware components and the software components can be assigned to the identifier of the rail vehicle. Furthermore, further information about software components and/or hardware components and in particular about rail vehicles can be stored in the central data memory 12. The further information is assigned via the corresponding identifiers of the software components, hardware components and the rail vehicles. A software component and/or a hardware component can therefore be assigned to a determined rail vehicle on account of the identifier. The further information may be, for example, a description of essential properties of the software component and/or the hardware component and/or documentation of the software component and/or the hardware component.

The central computation unit 13 is designed to compare the software component and/or the hardware component with at least one boundary condition prescribed for the rail vehicle and/or for the control system of the rail vehicle based on the identifier of the software component and/or the identifier of the hardware component. In this case, corresponding boundary conditions for the hardware components and/or software components and/or rail vehicles and/or control systems of the rail vehicles can be stored in the central data memory 12.

If the comparison results in the software components and/or hardware components installed in the rail vehicle and/or in operation not satisfying the prescribed boundary condition, the central computation unit 13 outputs a corresponding notification with the aid of the second transceiver unit 11 to the computation unit 5 via the first transceiver unit 6. The notification can be designed, for example, as a warning notification. In addition, the notification can contain the information about which software component and/or which hardware component does not satisfy which boundary condition. Based on this information, for example, the computation unit 5 can decide whether the software component and/or the hardware component continues to be operated, an update or an exchange is carried out, etc.

In addition, during said comparison, it is possible to check whether the software components and/or hardware components installed in the rail vehicle or in operation correspond to a software component and/or hardware component prescribed for the rail vehicle. If the check results in the software component and/or the hardware component not being the current or the matching software component and/or hardware component of the rail vehicle, the central computation unit 13 again outputs a corresponding message to the computation unit 5. Corresponding information is stored in the central data memory 12 for the comparison. For example, with the aid of this method in a simple manner, updates of software components can be carried out in a simple and up-to-date manner. Instead of or in addition to the notification that a software component does not satisfy a boundary condition, the central computation unit 13 can also transmit the better matching or up-to-date or current software component with the aid of the second transceiver unit 11 to the computation unit 5 via the first transceiver unit 6. The computation unit 5 saves the corresponding updated software component in the data memory 10 and uses the updated software component in a further implementation of a control method with the aid of the control system 2.

The central computation unit 13 can be designed to check based on the identifier of the software component whether a newer version of the software component is present. To this end, corresponding information is stored in the central data memory 12 or can be retrieved from a database by the central computation unit 13 via a further data connection. If the comparison results in a more current, that is to say newer, version of the software component existing, corresponding information and/or the new version of the software component is transmitted to the computation unit of the rail vehicle.

The above-described tasks and functions of the computation unit 5 can be executed by the computation unit 5 of the control system 2 or by a further computation unit 5 of the rail vehicle 1. The data can be transmitted between the first and the second transceiver unit 6, 11 in a wireless manner but also in a wired manner.

Using the described system, serial numbers and/or version numbers of used hardware components and/or software components in subsystems of the rail vehicle can be detected in an automated manner. A subsystem can be designed, for example, in the form of a control system or else in another form. With the aid of the described system, the detected information can be transmitted to a superordinate system, that is to say a stationary central system 14. The information can therefore be stored permanently in a stationary manner by means of the software components and hardware components installed or used in the rail vehicles or a rail vehicle. When software components and/or hardware components are changed, it is possible to determine in a simple and reliable manner which components are installed in a rail vehicle or in a plurality of rail vehicles. Outlay for troubleshooting is reduced and is thereby more efficient since the hardware components and/or software components used in the rail vehicle are known in the central system 14. Furthermore, when a hardware component is exchanged, a current software component for the changed hardware component can be loaded by the central system 14 in a simple manner according to a prescribed configuration of the rail vehicle.

Furthermore, the described system is advantageous since in the case of a rail vehicle release for a new software version the new software versions can be transmitted to the rail vehicles by the stationary central system 14 in an automated manner. The newly transmitted software versions can be stored here in the data memory 10. If the rail vehicle is subjected to maintenance, the software component newly stored in the data memory can be installed in the corresponding control system, in particular in the corresponding subsystem, by service personnel. Using this method, it is possible to increase the likelihood that the correct software component is installed and activated in the rail vehicle.

The central computation unit 13 can be designed as a central server, wherein the central computation unit 13 has documents and information, in particular all of the necessary documents and information regarding the installed hardware components and software components. This information can be stored, for example, in the central data memory 12 or can be retrieved from a database via a further data connection, for example via the Internet. It is therefore possible to access the information of the hardware components and/or the software components, in particular the corresponding documentation of the hardware components and/or software components, for example in the case of maintenance of the rail vehicle.

Although the invention has been more specifically illustrated and described in detail by means of the preferred exemplary embodiment, nevertheless the invention is not restricted by the examples disclosed and other variations can be derived herefrom by the person skilled in the art, without departing from the scope of protection of the invention.

The invention claimed is:

1. A method for operating a rail vehicle, the method comprising the following steps:
   storing an identifier for at least one of a software component or a hardware component installed in the rail vehicle in a data memory of a central stationary computation unit;
   using the central stationary computation unit to receive the identifier; and
   after receiving at least one of the identifier of the software component or the identifier of the hardware component:
      using the central computation unit to check whether at least one of the software component or the hardware component denoted by the identifier corresponds to at least one of a software component or a hardware component prescribed for the rail vehicle,
      using the central computation unit to access a corresponding database, and
      using the central computation unit to transmit at least one of a notification or the prescribed software component to the computation unit of the rail vehicle when at least one of the software component or the hardware component denoted by the identifier does not correspond to at least one of the software component or the hardware component prescribed for the rail vehicle.

2. The method according to claim 1, which further comprises assigning at least one of the identifier of the software component or the identifier of the hardware component to a predetermined rail vehicle.

3. The method according to claim 1, which further comprises receiving an identifier for the rail vehicle in which at least one of the software component or the hardware component are installed or in operation together with at least one of the identifier of the software component or the identifier of the hardware component.

4. A method for operating a rail vehicle, the method comprising the following steps:
   storing an identifier for a software component installed in the rail vehicle in a data memory of a central stationary computation unit;
   using the central computation unit to check, based on the identifier of the software component, whether a newer version of the software component is present, and
   using the central computation unit to transmit at least one of corresponding information or the newer version of the software component to the computation unit of the rail vehicle in response to the check indicating that the newer version of the software component is present.

* * * * *